United States Patent [19]
Cain et al.

[11] Patent Number: 5,369,691
[45] Date of Patent: Nov. 29, 1994

[54] TELEPHONIC INFORMATION COMMUNICATION METHOD AND APPARATUS

[75] Inventors: Charles J. Cain, Greenville, N.C.; Ronald R. Genova, Reading, Pa.

[73] Assignee: Utilex, Inc., Greenville, N.C.

[21] Appl. No.: 27,285

[22] Filed: Mar. 4, 1993

[51] Int. Cl.$^5$ .......................................... H04M 11/00
[52] U.S. Cl. ..................................... 379/106; 379/107; 379/102; 379/104
[58] Field of Search ............... 379/107, 106, 102, 104, 379/105, 98, 97, 93; 340/870.02

[56] References Cited

U.S. PATENT DOCUMENTS

| | | | |
|---|---|---|---|
| 3,937,889 | 2/1976 | Bell, III et al. | 179/2 DP |
| 4,007,454 | 2/1977 | Cain et al. | 340/200 |
| 4,165,505 | 8/1979 | Cain et al. | 340/200 |
| 4,332,980 | 6/1982 | Reynolds et al. | 179/2 A |
| 4,477,860 | 10/1984 | Wason et al. | 361/306 |
| 4,528,422 | 7/1985 | Cupani | 179/2 A |
| 4,665,516 | 5/1987 | Middleton et al. | 370/76 |
| 4,672,602 | 6/1987 | Hargrave et al. | 370/58 |
| 4,862,493 | 8/1989 | Venkataraman et al. | 379/107 |
| 5,010,568 | 4/1991 | Merriam et al. | 379/107 |

OTHER PUBLICATIONS

Matthews et al., *Remote Electricity Supply Meter Reading and Load Control*, Third International Conference on Measuring Apparatus and Tariffs for Electricity Supply; London, England (15–17 Nov. 1977).

*Primary Examiner*—Curtis Kuntz
*Assistant Examiner*—Stella L. Woo
*Attorney, Agent, or Firm*—Bell, Seltzer, Park & Gibson

[57] ABSTRACT

An apparatus for communicating information between customer locations and remote locations desiring the information exchange which allows the communications to occur over existing communications lines without interfering with the existing uses of those lines. The apparatus includes an acquisition device located at the customer's location, and a signal shifting means located at a local distribution point in relatively close proximity to the customer's location which receives an out-of-band signal from the customer location and converts it to an in-band signal transmitted over the greater distance to the remote location desiring the information exchange using normal telephone transmission through telephone company switch equipment. Also disclosed are methods for customer information exchange, in particular utility meter information, over existing communication lines, in particular telephone lines wherein the signals are transmitted out of band to a local distribution point then retransmitted to in-band signals for further transmission.

36 Claims, 4 Drawing Sheets

TELEPHONIC INFORMATION COMMUNICATION METHOD AND APPARATUS

FIELD OF THE INVENTION

This invention relates to methods and apparatus for communicating information between customer locations and remote locations desiring the information exchange. More particularly, the present invention is directed to such methods and apparatus which allow the communications to occur over existing communications lines without interfering with the existing uses of those lines.

BACKGROUND OF THE INVENTION

Various systems for utilizing existing telephone lines and power lines for carrying data from numerous locations for collection at a remote location point are known. Such systems are economically advantageous as they are able to utilize the existing infrastructure of these transmission media which extends to a significant portion of all the residential and business locations in the United States. However, the utility of the previously proposed systems is limited by the conflicting use of the lines for the existing purposes such as voice communications for the telephone network. Therefore, previous low cost systems have failed to provide the capacity to do demanding real time applications which cannot operate effectively using normal dial up procedures. An example of such a real time application is demand recording from utility meters. An additional problem with such previously known systems in real time applications is that the existing line must be released on demand for the existing use. For example, when the customer picks up his telephone to place a call the line must be made available to the customer. The present invention overcomes these limitations by utilizing the beneficial aspects of existing communications lines and telephone access while allowing access to the customer's location in a manner which does not affect existing uses for the existing communications line.

The present invention takes advantage of the structure of existing telephone lines. Existing lines are designed to preferentially pass only signals in the 300-3500 Hz frequency range which are audible on conventional telephone instruments. Existing telephone lines are run from the central office switch to a local distribution point known as a telephone company interface box (also referred to as a telephone pedestal or telephone vault) within which each individual pair is connected to the two-wire "loop" to the subscriber's house. A number of telephone lines fan out from the telephone company interface box to individual residences in a given neighborhood. The telephone interface box is typically within two thousand feet of each of the residences it serves, and within a few hundred feet in a great many cases. In every case, however, it lies between the residence and the telephone switch through which conventional calls must pass on their way to or from the residence. The telephone interface box typically has no power supply as the phone system works on power supplied by batteries associated with the switch.

The central office switch is an elaborate and expensive computerized device which permits any telephone on the system to be connected to any other. There is a separate, identifiable pathway from each numbered connection on the switch to a corresponding subscriber's telephone. From the 10,000 numbered connections on a typical switch, large bundles ("trunks") of individual lines disperse to the various neighborhoods served, each line ("pair") destined for a given subscriber's instrument. In each neighborhood the individual pairs in a trunk then enter a telephone company interface box.

The present invention utilizes the switched phone network to interface with an apparatus located at the telephone company interface box or other local distribution point to allow large numbers of customer locations to be rapidly accessed without the burdensome overhead of the switch while still maintaining the low cost benefits of the existing phone network. The present invention also provides for information access without interference with existing communication uses by utilizing normally attenuated out-of-band frequencies for communications over the relatively short distances between the local distribution point and the customer locations. The present invention further permits information access while telephone service is disconnected (cut-off at the switch). The present invention also avoids the problems which frequent telephone number reassignments cause previous systems which require a telephone call to be placed to each customer location.

To provide an economically feasible apparatus for communicating information between individual residential or commercial locations and remote locations it is an object of the present invention to take advantage of the infrastructure of existing communication lines such as telephone lines or cable lines. Furthermore, to allow such a system to operate in a real time or on demand mode, it is an object of the present invention to provide an apparatus which is designed to operate independently of the existing uses for the line to allow simultaneous use of the existing communication lines for their present purpose as well as for either bidirectional or unidirectional information exchange.

It is an object of the present invention to provide an apparatus for automated acquisition of one or more of a customer's utility meter readings using the customer's telephone line.

It is a further object of the present invention to provide an apparatus which may be used to collect readings from one or more meters or other devices at one or more customer locations.

It is a further object of the present invention to provide a method for customer information communication between a customer and a requesting location over existing communication lines.

It is a further object of the present invention to provide a method for communication of customer information even while voice service is disconnected.

It is a further object of the present invention to provide a method of reducing the cost of maintaining a data communications link with a given location even though the telephone number of that location may be frequently changed.

It is a further object of the present invention to provide a method for automated utility meter reading over a telephone line of a customer regardless of whether a request is received from a remote location.

SUMMARY OF THE INVENTION

These and other objects are provided by the apparatus of the present invention which includes an acquisition means electrically connected to the customer's telephone line which converts the customer's utility meter readings or other information to an out-of-band electrical signal. The acquisition means transmits the out-of-band electrical signal over the customer's telephone line at a frequency sufficiently offset from customer voice communication frequencies to substantially reduce interference during concurrent transmission of both the out-of-band electrical signal and customer voice communications over the customer's telephone lines if such voice communications are underway or initiated. The apparatus further includes a signal shifting means located at a local distribution point which converts the out-of-band electrical signal from the customer's telephone line to an in-band electrical signal. The in-band electrical signal is configured to be transmitted over a telephone link connecting through a telephone company central office switch to a remote location. This apparatus provides the customer's utility meter readings to the remote location automatically.

In another aspect of the invention an apparatus is provided wherein each signal shifting means is adapted to obtain information from a plurality of customers whose telephone lines connect through the local distribution point where the signal shifting means is located. The remote location may acquire information from numerous local distribution points by placing calls to signal shifting means located in each local distribution point. In one such embodiment the signal shifting means includes a scanning means located at each local distribution point which receives the out-of-band electrical signal from each of the customers' telephone lines without disrupting customer voice communications. The scanning means has a plurality of input ports and an output port. The input ports are electrically connected to the customers' telephone lines and the scanning means selectively provides a selected meter reading at the output port. The signal shifting means also includes a control means electrically connected to the scanning means which selects the meter readings to be provided at the output port of the scanning means and selectively groups one or more of the selected meter readings from the scanning means as a data reading packet, The signal shifting means also includes a re-transmitting means electrically connected to a telephone link connecting through a telephone company central office switch. The re-transmitting means is responsive to the control means and transmits the data reading packet as an in-band electrical signal over the telephone link. A communication means located at a remote location receives the in-band electrical signal over the telephone link.

In another aspect of the invention a method is provided for customer information communication. A request for customer information from a requesting location is transmitted by telephone through a telephone company switch to a local distribution point. The request is received at the local distribution point. A request for customer information is transmitted from the local distribution point to the customer over existing communication lines modulated at a first out-of-band frequency range as an out-of-band frequency request. The out-of-band frequency request from the local distribution point is received at the customer location to provide an information request to the customer. Customer information responsive to the information request to the customer is electrically encoded and transmitted over the existing communications lines modulated at a second out-of-band frequency range as an out-of-band frequency information reading. This information reading is received at the local distribution point and re-transmitted from the local distribution point at in-band-frequencies through a telephone company switch to the requesting location. It is a further object of the present invention to provide a method as described suitable also for customer control communication between a customer and a requesting location over existing communication lines where there may or may not be any need to transmit information from the customer location back to the remote location.

As a further aspect of the invention, a method is provided for automated utility meter reading. One or more of a customer's utility meter readings are electrically encoded. The electrically encoded readings are transmitted onto the customer's telephone line as an out-of-band frequency reading signal which is operatively transmitted concurrently over the customer's telephone line between the customer and the local distribution point with or without any customer voice communications. The encoding and transmitting steps are performed one or more times. Selected ones of the out-of-band frequency readings are received at a local distribution point. They are converted to data readings at the local distribution point. The data readings are selectively re-transmitted as in-band frequency reading signals over a telephone link connecting through a telephone company central office switch and then acquired at one or more remote locations through the telephone company central office switch to provide the customer's utility meter readings automatically to the remote locations. It is a further object to provide such a method suitable for reading one or more types of utility meters of a plurality of customers using the customers' telephone lines by grouping the data readings from selected customers to provide a data reading packet which is selectively provided and acquired at the appropriate remote location.

DETAILED DESCRIPTION OF THE INVENTION

The present invention will now be described more fully hereinafter. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
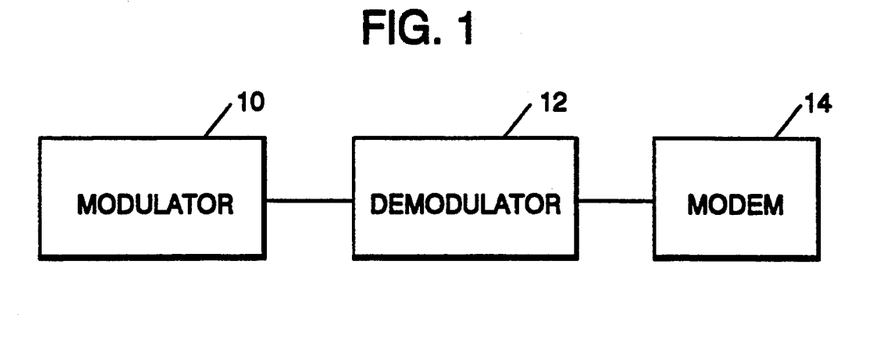
FIG. 1 is a block diagram illustrating a unidirectional communication apparatus according to the present invention.

An embodiment of the information communication apparatus of the present invention is generally shown in FIG. 1. In this embodiment, customer information, such as utility meter readings and alarm conditions, is transmitted from a customer location to the requesting location without any communication from the requesting location back to the customer location. The meter reading or other customer information is converted by modulator 10, which is located at the customer location, to an out-of-band signal that will not interfere with the existing communication line usage. However, as the existing communication line is specifically designed to attenuate such out-of-band signals, such a signal is not able to be transmitted over long distances. Therefore, the signal is received at an intermediate location where it is converted back into a data format by demodulator 12. The customer information is then converted by modem 14 into an in-band-frequency signal suitable for normal transmission over the existing communication line. Consequently, the signal is only carried transparently on a shared line to the intermediate location after which it is transmitted on its own line with bi-directional communications between modem 14 and the requesting location.

Figure 2:
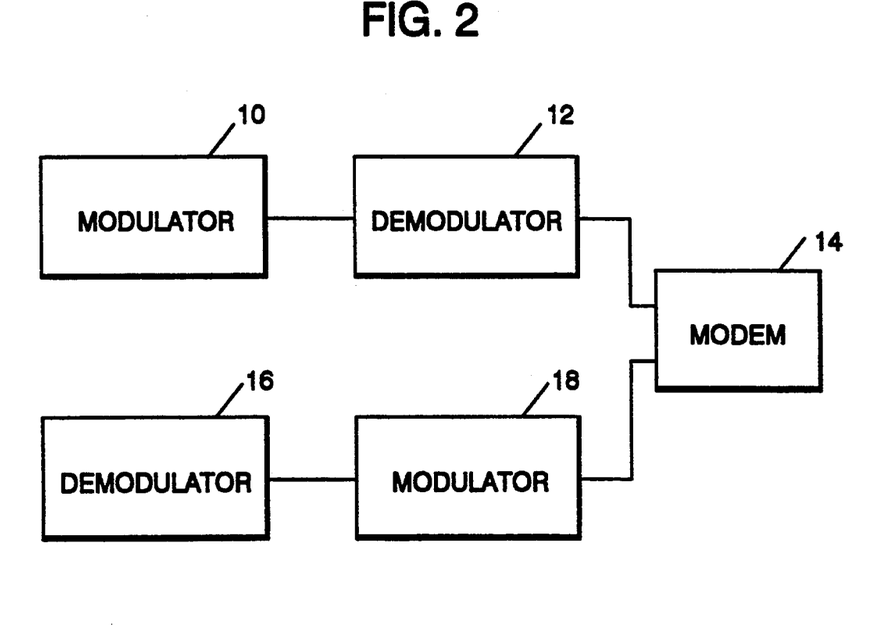
FIG. 2 is a block diagram illustrating a bidirectional communication apparatus according to the present invention.

Alternatively, as shown in FIG. 2, bi-directional communications to the customer location may be provided. Bi-directional communications are obtained by the addition of a second demodulator 16 at the customer location and a corresponding second modulator 18 at the intermediate location. If second modulator 18 and second demodulator 16 are designed to operate at a different carrier frequency from modulator 10 and demodulator 12, information communication in both directions may occur simultaneously over the existing communication line. Such a bi-directional arrangement allows reading of demand recorders, remote service disconnect with confirmation, provides a domestic automation gateway and provides greater selectivity in meter reading applications.

Figure 3:
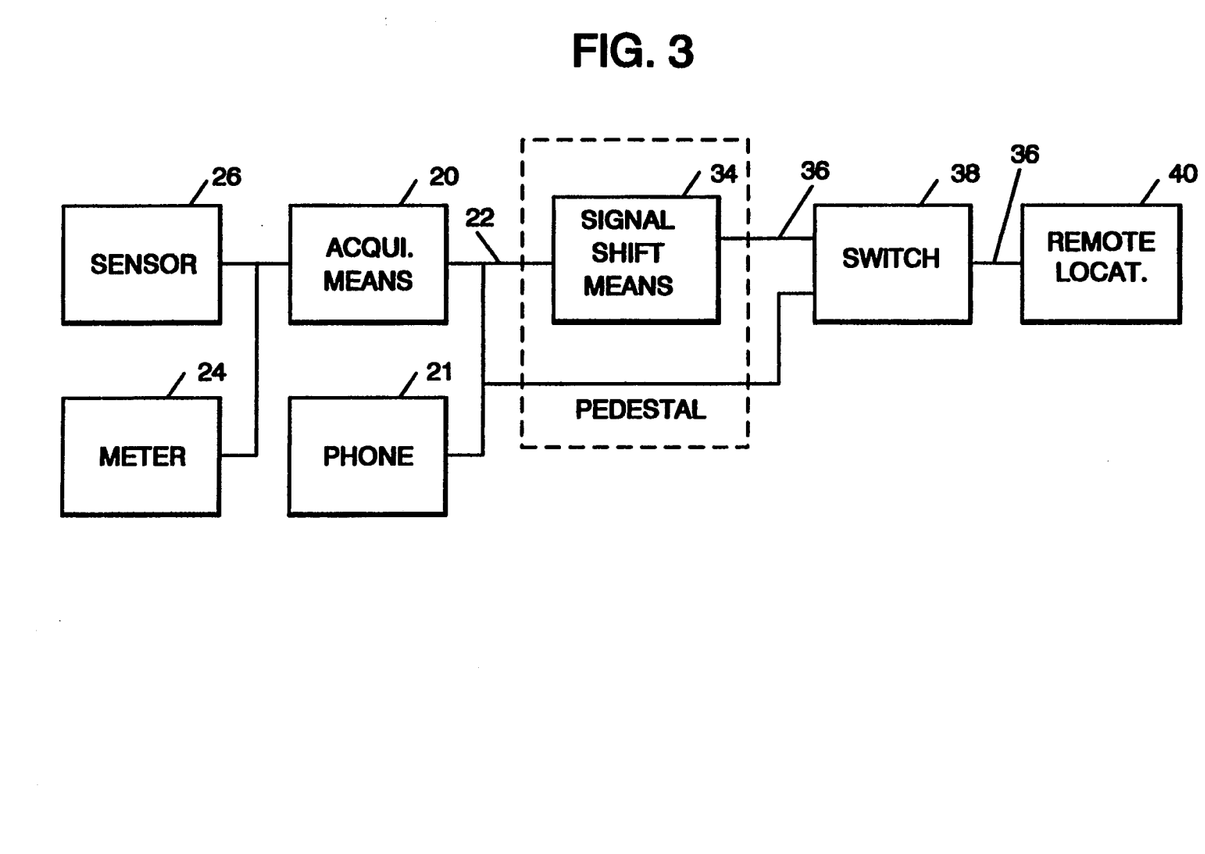
FIG. 3 is a block diagram illustrating an embodiment of the customer information communication apparatus of the present invention.

An embodiment of the apparatus of the present invention for automated reading of one or more utility meters of each of a plurality of customers using the customers' telephone lines is shown in FIG. 3. Acquisition means 20 located at the customer's residence is electrically connected to the customer's telephone line 22 and also to one or more of the customer's utility meters 24 providing utility meter readings. The apparatus may also be connected to other information sources/control devices 26 at the customer location. Acquisition means 20 converts the utility meter readings to an out-of-band electrical signal and transmits the out-of-band electrical signal over the customer's telephone line 22. Acquisition means 20 includes an encoding means 30 operatively associated with one or more of each of the customers' utility meters 24 or other information sources or control devices 26 for converting the customers' utility meter readings to an electrical signal, and a transmitting means 32 electrically connecting encoding means 30 to the customer's telephone line and converting the electrical signal to an out-of-band electrical signal. The out-of-band electrical signal has a carrier frequency selected so as not to interfere with the customer's normal voice communications over telephone line 22. This is accomplished in this embodiment using the existing customer's telephone line by having the frequency of the out-of-band electrical signal sufficiently offset from customer voice communication frequencies to substantially reduce interference during concurrent transmission of both the out-of-band electrical signal and customer voice communications over the customer's telephone lines. In one embodiment using telephone lines for transmission, the frequency of the out-of-band electrical signal is between about 20 kHz and about 100 kHz.

Figure 4:
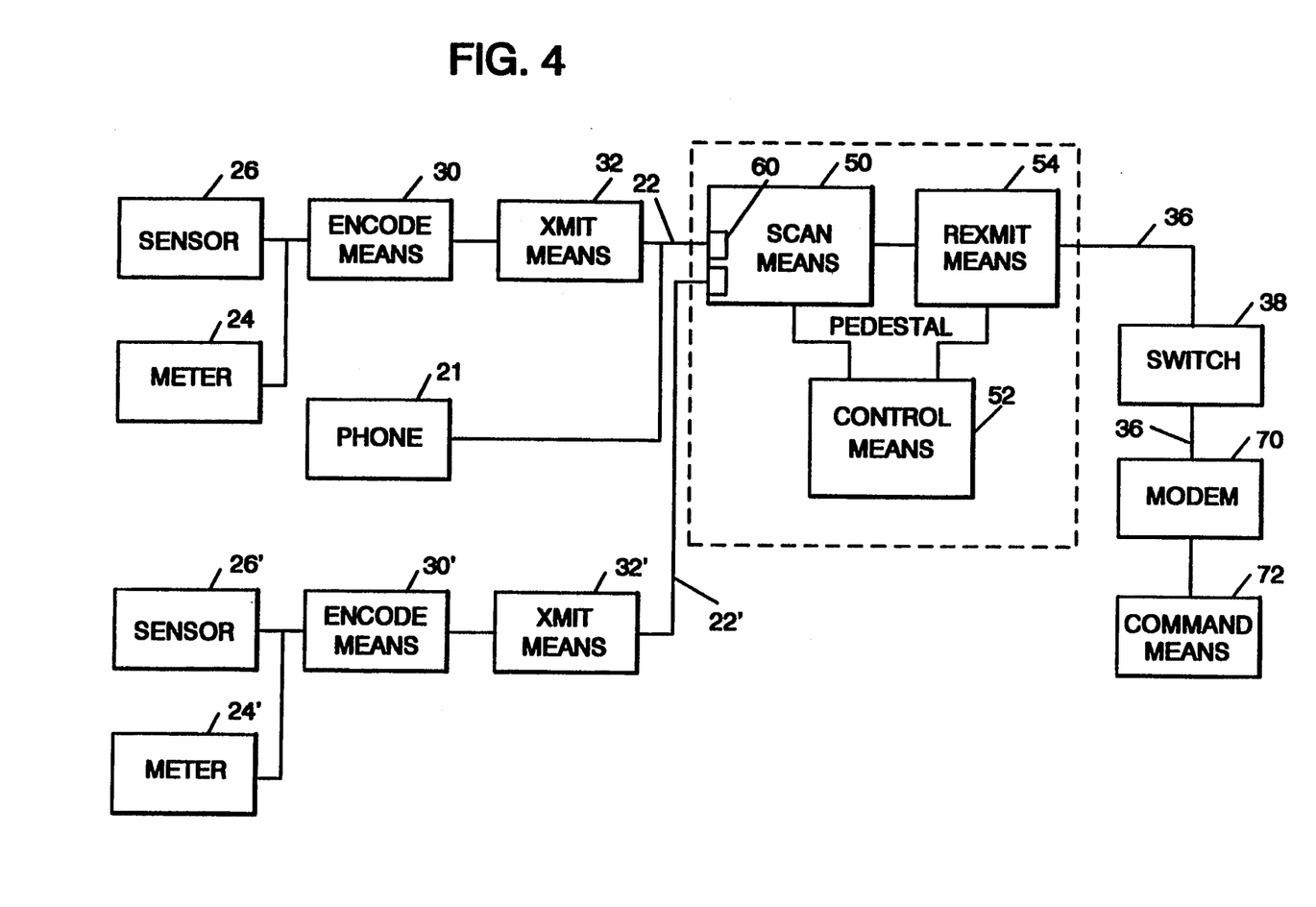
FIG. 4 is a block diagram illustrating an embodiment of the customer information communication apparatus of the present invention.

As shown in FIG. 4, transmitting means 32 is a meter interface unit located in a socket extender behind the watthour meter, and draws its operating power from the electric utility's side of the meter. Meter interface unit 32 includes several components: a power supply of conventional design such as the Polytron P33-12SXE; a modulator such as Exar's XR-2206P integrated circuit and related components; and a microcontroller such as the Hitachi H8-300. Transmitting means 32 may also include various components providing protection against noise, lightning and other surges. The meter interface unit 32 obtains its meter-reading inputs from a dial encoder 30 or other encoding means. One suitable type of encoding means for utility meters is the Cain Encoder TM, which is described in U.S. Pat. No. 4,007,454, the disclosure of which is incorporated herein by reference as if set out in its entirety.

Meter interface unit 32 serves to power encoding means 30, obtain dial readings from it, convert these dial readings to inaudible signals, and place these signals on the customer's line at the protector or other point slightly "upstream" (i.e., toward the telephone pedestal) from the customer's telephone instrument such as to be detectable by signal shifting means 34. Meter interface unit 32 is capacitively coupled to line 22, therefore the customer's use of line 22 is not affected, and because the data stream is at out-of-band frequencies (in one embodiment, 20 and 22 kHz) it is inaudible when line 22 is in use. Moreover, for the same reason the data stream cannot interfere with facsimile machines, modems, or answering machines, all of which use only in-band signals.

Signal shifting means 34 located at a local distribution point, such as a telephone company interface box (also referred to as a telephone pedestal or vault) or CATV amplifier (where used with the cable line as the existing communication line rather than the telephone line), converts the out-of-band electrical signal from the customer's telephone line 22 to an in-band electrical signal having a frequency within the range of customer voice communications. The in-band electrical signal is configured to be transmitted over a second telephone link 36 connecting through a telephone company central office switch 38 to a remote location 40. A connection is made using normal voice frequency in-band communications connected through the telephone company central office switch between remote location 40 and signal shifting means 34. Once the connection is made, the customer's utility meter readings may be provided to remote location 40 either responsive to a request from remote location 40 or initiated by the signal shifting means 34.

As shown in FIG. 4, one embodiment of signal shifting means 34 includes scanning means 50, control means 52 and re-transmitting means 54, all of which are located at the local distribution point. Scanning means 50 receives the out-of-band electrical signal from each of one or more customer's telephone lines 22 without disrupting customer voice communications. Scanning means 50 has a plurality of input ports 60 and an output port 62. Input ports 60 are electrically connected to the customers' telephone lines 22. Scanning means 50 selectively provides selected meter readings from acquisition means 20 associated with different customers received at respective ones of the input ports 60 at output port 62.

Control means 52, which is electrically connected to scanning means 50, selects the meter reading to be provided at output port 62 of scanning means 50. Control means 52 also selectively groups one or more of the selected meter readings from scanning means 50 into a data reading packet. In one embodiment, the data reading packet would include the most recent meter readings from a particular meter type, such as a gas meter, for all of the plurality of customer locations whose telephone lines 22 are electrically connected to the input ports 60 of scanning means 50.

Re-transmitting means 54, which is electrically connected to a second telephone link 36 connecting through telephone company central office switch 38, transmits the data reading packet as an in-band electrical signal over telephone link 36. Re-transmitting means 54 operates responsive to commands from control means 52.

Communication means 70, which is located at the remote location 40, receives the in-band electrical signal from re-transmitting means 54 over telephone link 36. In one embodiment of the present invention, transmission of the data reading packet is initiated responsive to a request from remote location 40 which is transmitted to signal shifting means 34 by communication means 70. In such an embodiment, communication means 70 includes a command means 72 which provides a data request which is transmitted by communication means 70 over telephone link 36. On receipt of the request, control means 52 provides an updated data reading packet and initiates transmission of the data reading packet by re-transmitting means 54. The data request from the remote location may also instruct control means 52 as to what information to include in the data reading packet.

Figure 5:
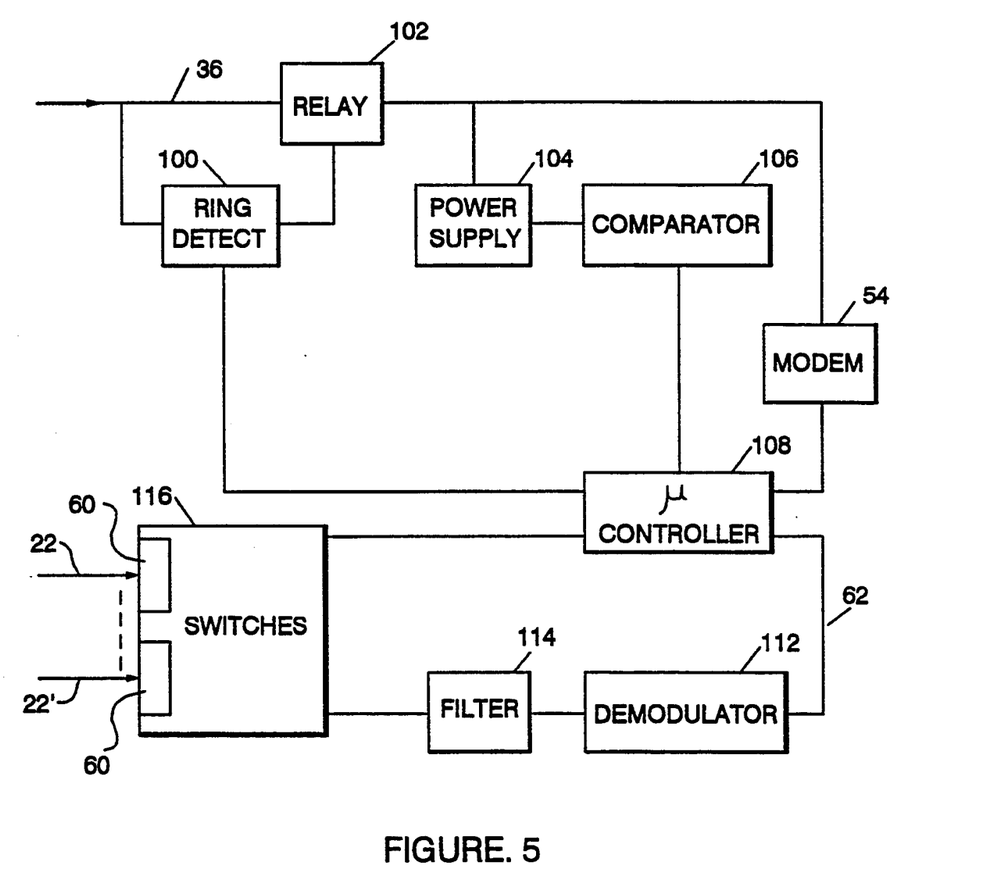
FIG. 5 is a block diagram illustrating an embodiment of the signal shifting means of the present invention.

An embodiment of the signal shifting means 34 of the present invention is shown in FIG. 5. Signal shifting means 34 includes a ring-detect circuit 100 of conventional construction such as AT&T's LB1006AB integrated circuit which is electrically connected to telephone link 36. A relay 102 such as a Potter & Brumfield T83S11D132-05 connects signal shifting means 34 to telephone link 36. Power supply 104 for regulating power to signal shifting means 34 consists of a DC-to-DC converter such as a Datel UWR-5/500-D48 and related components. Comparator 106, such as the Maxim MAX480CPA serves as a low voltage detector for use with the power control logic of signal shifting means 34 to be described. Control means 52 includes microcontroller 108 which provides logical functions. Microcontroller 108 may be a Hitachi H8-300 or similar microcontroller.

Scanning means 50 includes a group of individually controllable DPST switches 116 such as AT&T's LH1503AB solid-state relays. Switches 116 are connected to respective ones of the customer's telephone lines 22, 22'. Each of the customer's telephone lines 22, 22' is also connected through, either on a dedicated line or through an SLC not shown in the Figure, to the telephone company switch 38 used for the customer's normal telephone communications. Activation of any such switch 116 causes modem 54 or other re-transmitting means to be capacitively coupled to each of the two conductors, the tip and ring lines, which comprise the corresponding line 22. This capacitive coupling does not permit DC current to flow from the customer's telephone line 22 through signal shifting means 34. If such a current were to flow, the telephone company central office switch 38 would think the customer wished to make a call and would take respective line 22 off hook, apply a dial tone, and give a "busy" signal to any other line which attempted to call the customer at that moment. Therefore, because signal shifting means 34 capacitively couples to the customer's line and does not affect the line's status, both incoming and outgoing calls can proceed normally and will not be affected by the presence of signal shifting means 34.

Modem 54 or other re-transmitting means is designed for operation within the passband of the telephone system, i.e., in-band frequencies, such as a Silicon Systems SSI173K222L-IP and related components. Modem 54 is connected through relay 102 to a separate, independent link from switch 38 which is assigned to signal shifting means 34. Signal shifting means 34 answers calls directed to it over its link. Scanning means 50 further includes a demodulator 112 such as Exar's XR-2211P integrated circuit and related components such as band pass filter 114, so constructed as to detect signals in the selected out-of-band frequency range, in one embodiment selected as 20 kHz and 22 kHz. Demodulator 112 is designed to detect and discriminate between these two frequencies, which represent a binary one and zero, respectively. The output port 62 of demodulator 112 is connected to microcontroller 108 and thereby to modem 54. Various additional components provide protection against noise, lightning and other surges.

Because signal shifting means 34 must function on long or very high impedance lines, the embodiment shown in FIG. 5 includes an "aspirating" feature in its power supply. Comparator 106 signals microcontroller 108 when the line voltage on line 36 falls below a predetermined value, causing microcontroller 108 to shed all deferable current loads and to enter a low-power "sleep" mode so as to allow the line voltage to recover and to replenish the charge on the power supply's large input capacitor. When comparator 106 signals that line 36 has sufficiently recovered microcontroller 108 resumes normal operation. The practical effect of this arrangement is that the unit adjusts itself to the line impedance, producing only occasional brief pauses between characters on a line whose impedance would otherwise prevent operation entirely.

To read a meter using an embodiment of the present invention, a computer 72 or other command means at the utility office utilizes a modem 70 or other communication means to dial the ordinary telephone number of the respective signal shifting means 34 to which the meter 24 to be read is connected. Whereas initially signal shifting means 34 is without power and inactive, its ring-detect circuit 100 is activated by the ringing signal and trips relay 102, connecting modem 54 and its large (2200 mF) capacitor across tip and ring lines of the incoming (calling) line 36. As this capacitor begins to charge, the telephone switch 38 interprets the inrush current to mean that the line has been answered and removes the ringing signal from the line. After a few seconds (a function of line impedance) comparator 106 senses that the capacitor has reached a predetermined voltage and turns on the DC-to-DC converter which supplies 5 VDC to the remaining circuits in signal shifting means 34. Once the 5 VDC is stable, microcontroller 108 initializes itself, modem 54, and the selectively controllable switches 116, issues a prompt to the utility computer 72 and monitors modem 54 for a password and subsequent commands defining what data to collect and send. If an incorrect password is received, or if nothing is received from the utility computer 72 for about thirty seconds, signal shifting means 34 terminates the call. Upon receiving a proper password and a valid reading command, however, signal shifting means 34 activates the proper switch 116 and capacitively couples to the customer's line 22 to which the meter of interest is connected. Demodulator 112 informs microcontroller 108 whether it detects a signal in the range 20-22 kHz: if so, microcontroller 108 reconstructs the encoder's message from the stream of ones and zeroes detected by demodulator 112, checks for proper parity and format, and causes modem 54 to return this message to utility computer 72 in the form of a sequence of conventional modem tones. (If the demodulator fails to find the expected 20-22 kHz "carrier" the controller issues an error message and awaits further instructions.) In this manner all meters connected to the customer lines within a particular telephone company interface box can be read via a single telephone call to signal shifting means 34, and one or more signal shifting means can be called simultaneously, many of which will serve several hundred lines each from large telephone company interface boxes. There is thus effected a means of reading meters rapidly without employing the telephone test trunk, without adding significant traffic through the telephone switch, without interference with or by the customer's use of the telephone line, and without the delay of other systems which cannot function while the line is in use.

The present invention is also directed to a method for customer information communication between a customer, either residential or commercial, and a requesting location 40 over existing communication lines 22. Such methods may be practiced using the apparatus described above and illustrated in FIGS. 1 to 5. Communication lines suitable for use with the present invention would include any installed link such as traditional tip-ring wire pair type telephone lines or cable television lines. The information exchange is initiated by a request for customer information, such as a utility meter reading, which is transmitted from a requesting location 40, such as a utility company office, by telephone. Other types of information could include alarm readings, demand recorder readings, voltage data, or other status or meter type information.

The invention could also be used where a customer control message is transmitted rather than an information request, thereby requiring only one way communications between the remote requesting location and the customer. For example, the control message could be sent to a switch in a customer's residence to trigger turning on the customer's lights or heater. Such a customer control request could also be transmitted from a requesting source such as a utility company to control electrical service or telephone service connection to the customer. Communications could also be one way from the customer to the requesting location 40 wherein information transfer would occur without requiring an initiating request from the requesting location 40.

The telephone link 36 from the utility company 40 is routed through a telephone company switch 38 like any other phone call. This telephone link 36, like existing voice communications, may occur over a tip-ring wire pair, a pair-gain or subscriber line carrier system, or using known cellular telephone methods. On a pair-gain system, demultiplexers on the subscriber side of the central office switch may employ frequencies in the 8-10 kHz range which may be present on the existing communications line 22 over which the present invention maintains substantially transparent communications. The call from the utility company, rather than being directed to a specific customer's residence, is picked up by a signal shifting means 34 at an intermediate local distribution point located between the telephone company switch station and the customer's residence. A telephone company interface box is one acceptable local distribution point.

The request for customer information is received at the local distribution point by the signal shifting means 34. The request for customer information is then transferred from the local distribution point to the customer over existing communication lines 22 modulated at a first out-of-band frequency range as an out-of-band frequency request. The out-of-band frequency range is determined based on the frequency characteristics of communications line 22 and of the existing receiver 21, for example the customer's telephone. The frequency for the out-of-band frequency range is chosen to allow information to be exchanged over the existing communication lines 22 without disrupting existing uses, such as customer voice communications over existing telephone lines. For an embodiment of the present invention using existing telephone lines, the out of band frequency could be between about 20 kHz and 100 kHz.

The out-of-band frequency request from the local distribution point is received at the customer's residence to provide an information request to the customer. The request may be received by an acquisition means 20 which is in turn electrically connected to the device information is requested from, for example, one of the customer's utility meters 24. The appropriate customer information is electrically encoded responsive to the information request to the customer. For example, if the information requested is a gas meter reading, an encoding means 30, such as the Cain Encoder TM, converts the utility dial reading into an electrically encoded signal representing the customer's present gas meter reading. Alternatively, the request could initiate direct reading from a counter which is photoelectrically incremented by each turn of the meter's rotating disc. Either approach provides a meter reading.

Once the electrically encoded customer information is generated it is transmitted over the existing communications lines 22 modulated at a second out-of-band frequency range as an out-of-band frequency information reading. The use of two different out-of-band frequency ranges allows requests from the local distribution point and information from the customer's residence to be transmitted over the existing communication lines simultaneously as shown generally in FIG. 2. The out-of-band frequency information reading is then received at the local distribution point. Finally, the out-of-band frequency information reading from the local distribution point is re-transmitted at in-band-frequencies through a telephone company switch 38 back to the requesting location.

The present invention is also directed to a method for automated utility meter reading over a telephone line 22 of a residential or commercial customer operating independently of whether a request is initiated from a remote location. One or more of the customer's utility meter readings is electrically encoded as discussed above. The electrically encoded readings are then transmitted onto the customer's telephone line 22 as an out-of-band frequency reading signal by modulating the utility meter readings. This reading may be operatively transmitted over the customer's telephone line 22 regardless of whether the customer's phone 21 is on or off hook and may be transmitted concurrently over the customer's telephone line 22 between the customer and the local distribution point even if customer voice communications are underway.

The encoding and transmitting steps may be performed one or more times. This encoding and transmitting may occur on a continuous basis or at predetermined intervals or responsive to an out-of-band frequency request transmitted from the local distribution point over the customer's telephone line 22 between the customer and the local distribution point. The request initiating encoding and transmitting may originate at the local distribution point or at a remote location 40 or from a customer's location as with alarm signals.

Selected out-of-band frequency readings are received at a local distribution point. The selection could be based on the type of utility meter reading desired, for example gas or electric. Alternatively, the selection could be based on time interval, for example, where the encoding and transmitting is performed continuously, the readings could be read at the local distribution point only at fixed intervals or responsive to requests transmitted to the local distribution point from a remote requesting location 40 such as a utility company.

The received selected out-of-band frequency readings are converted to data readings at the local distribution point. The out-of-band frequency readings reflecting the utility meter readings may be demodulated to provide data readings. The data readings are then selectively re-transmitted as in-band frequency reading signals over a telephone link 36 connecting through a telephone company central office switch 38. The selective re-transmission could be determined based on the type of meter reading to assure that the appropriate information was transmitted only to the proper requesting location: for example, to insure that only gas meter readings were sent to the gas company. The in-band frequency reading signals are acquired at one or more remote locations 40 through the telephone company central office switch 38 to provide the customer's utility meter readings automatically to the remote locations.

The step of selectively re-transmitting the readings may be initiated by transmitting a request from a remote location 40 over the link 36 connecting through the telephone company central office switch 38. Furthermore, where the selective re-transmitting is based on meter type, this selection may be made responsive to the request from the remote location.

The methods of the present invention may be used for automated reading of one or more types of utility meters of a plurality of customers. For example, each customer's residence could have both gas and electrical meters accessible from a plurality of remote locations including the gas company and the electrical company. Furthermore, a plurality of customer's residences could be accessible from each local distribution point. For example, when using existing telephone lines as the communications line 22 and a telephone company interface box as the local distribution point, an entire neighborhood might be accessible from a single local distribution point which would contain a juncture point for the telephone line connection between all of those customers and the telephone company central office station 38.

Where multiple customers each having one or more meters linked into the system are serviced from a given local distribution point, the method of the present invention may include additional selection operations after the acquisition of customer information and prior to re-transmitting selected information to the remote location 40 wishing to receive the information. The step of converting the received out-of-band frequency readings to data readings may be performed for selected customers accessible from that local distribution point. The selected customers may be only a single customer or all customers accessible from that local distribution point. Information may be obtained from one or more of the meters 24 or other devices 26 at the customer's location from which information is available. The data readings may then be grouped prior to re-transmitting the information to the remote location or locations.

In one embodiment, the grouping step involves selecting the reading from a first type of utility meter from all of the customers to provide a data reading packet including the last reading from the first type of utility meter from all customers having the first type of utility meter. For example, the most recent gas meter readings from all of the accessible customers could be grouped into a data reading packet which is then selectively re-transmitted to the gas company.

The determination of what to include in the data reading packet may be made responsive to a request from the remote location. Where the encoding and transmitting of the customer information is performed continuously, the steps of receiving, converting and grouping the information may be performed each time the encoding and transmitting step is repeated to provide a data reading packet representing the last reading received from the customer. The step of re-transmitting may then be performed each time an updated data reading packet is created to continuously provide to the remote location 40 the last utility meter reading or other information from each of the selected customers. Alternatively, the step of re-transmitting could be performed responsive to a request from the remote location 40.

The foregoing description is illustrative of the present invention, and is not to be construed as limiting thereof. The invention is defined by the following claims, with equivalents of the claims to be included therein.

That which is claimed is:

1. A method for automated utility meter reading over a telephone line of a customer, comprising:
   (a) electrically encoding one or more of a customer's utility meter readings;
   (b) transmitting the electrically encoded readings onto the customer's telephone line as an out-of-band frequency reading signal which is operatively transmitted concurrently over the customer's telephone line between the customer and the local distribution point with or without any customer voice communications;
   (c) performing steps (a) and (b) one or more times;
   (d) receiving selected out-of-band frequency readings at a local distribution point;
   (e) converting the received selected out-of-band frequency readings to data readings at the local distribution point;
   (f) selectively re-transmitting the data readings as in-band frequency reading signals over a telephone link connecting through a telephone company central office switch; and
   (g) acquiring the in-band frequency reading signals at one or more remote locations through the telephone company central office switch to provide the customer's utility meter readings automatically to the remote locations.

2. A method according to claim 1, wherein step (f) of selectively re-transmitting the readings includes initiating re-transmitting by transmitting a request from a remote location over the link connecting through the telephone company central office switch.

3. A method according to claim 1, wherein said step (b) of transmitting the electrically encoded readings onto the customer's telephone line includes initiating transmitting responsive to an out-of-band frequency request transmitted from the local distribution point over the customer's telephone line between the customer and the local distribution point.

4. A method according to claim 2, wherein said step (f) of selectively re-transmitting includes selecting which of the customer's utility meter readings to provide to the requesting remote location responsive to the request from the remote location.

5. A method according to claim 2, wherein the request from the remote location also initiates step (c) of repeating the encoding and transmitting of the readings onto the customer's telephone line.

6. A method according to claim 1, wherein step (c) of repeating the encoding and transmitting of the readings onto the customer's telephone line occurs at predetermined time intervals.

7. A method according to claim 1, wherein step (c) of repeating the encoding and transmitting of the readings onto the customer's telephone line occurs continuously.

8. A method according to claim 1 wherein step (d) of receiving selected out-of-band frequency readings and step (e) of converting the received selected out-of-band frequency readings are performed at a local distribution point comprising a telephone company interface box.

9. A method according to claim 1 wherein step (b) of transmitting the electrically encoded readings is performed using an out-of-band frequency of between about 20 kHz and about 100 kHz.

10. A method according to claim 1 wherein step (b) of transmitting the electrically encoded readings includes modulating the utility meter readings and wherein step (e) of converting the received selected out-of-band frequency readings includes demodulating the utility meter readings.

11. A method for automated reading of one or more types of utility meters of a plurality of customers using the customers' telephone lines, comprising:
(a) electrically encoding one or more of each customer's utility meter readings;
(b) transmitting each customer's electrically encoded readings onto the customer's telephone line as an out-of-band frequency reading signal which is operatively transmitted concurrently over the customer's telephone line between the customer and the local distribution point with or without any customer voice communications;
(c) repeating steps (a) and (b) one or more times;
(d) receiving the out-of-band frequency readings from selected customers at a local distribution point;
(e) converting the received out-of-band frequency readings from selected customers to data readings at the local distribution point;
(f) grouping the data readings from selected customers to provide a data reading packet;
(g) selectively re-transmitting the data reading packet as an in-band frequency reading signal over a telephone link connecting through a telephone company central office switch; and
(h) acquiring the in-band frequency reading signal at one or more remote locations through the telephone company central office switch to provide the customers' utility meter readings automatically to the remote locations.

12. A method according to claim 11, wherein said step (g) of selectively re-transmitting includes initiating re-transmitting by transmitting a request from a remote location over the link connecting through the telephone company central office switch.

13. A method according to claim 12, wherein said step (f) of grouping includes selecting which utility meter readings from which customers to provide to the requesting remote location responsive to the request from the remote location.

14. A method according to claim 12, wherein the request from the remote location also initiates step (c) of repeating the encoding and transmitting of the readings onto the customers' telephone line.

15. A method according to claim 11, wherein step (c) of repeating the encoding and transmitting of the readings onto the customer's telephone line occurs at predetermined time intervals.

16. A method according to claim 11, wherein step (c) of repeating the encoding and transmitting of the readings onto the customer's telephone line occurs continuously.

17. A method according to claim 11, wherein step (d) of receiving selected out-of-band frequency readings and step (e) of converting the received selected out-of-band frequency readings are performed at a local distribution point comprising a telephone company interface box.

18. A method according to claim 12, wherein said step (f) of grouping comprises selecting the reading from a first type of utility meter from all of the customers to provide a data reading packet including the last reading from the first type of utility meter from all customers having the first type of utility meter.

19. A method according to claim 18, wherein step (d) of receiving selected out-of-band frequency readings, step (e) of converting the received selected out-of-band frequency readings and step (f) of grouping are repeated each time step (a) and step (b) are repeated to provide a data reading packet representing the last reading from step (e) and said step (g) of selectively re-transmitting includes transmitting the data reading packet each time step (d), step (e) and step (f) are repeated to continuously provide to the remote location the last utility meter reading from each of the customers.

20. An apparatus for automated reading of one or more utility meters of each of a plurality of customers using the customers' telephone lines, comprising:
encoding means operatively associated with one or more of each of said customers' utility meters for converting said customers' utility meter readings to an electrical signal;
transmitting means electrically connecting said encoding means to said customers' telephone lines for converting said electrical signal to an out-of-band electrical signal having a frequency, wherein the frequency of said out-of-band electrical signal is sufficiently offset from customer voice communication frequencies to substantially reduce interference during concurrent transmission of both said out-of-band electrical signal and customer voice communications over said customers' telephone lines;
scanning means located at a local distribution point for receiving said out-of-band electrical signal from each of said customers' telephone lines without disrupting customer voice communications, said scanning means having a plurality of input ports and an output port, said input ports being electrically connected to said customers' telephone lines and said scanning means selectively providing a selected meter reading at said output port;

control means electrically connected to said scanning means for selecting the meter reading to be provided at said output port of said scanning means and for selectively grouping one or more of said selected meter readings from said scanning means as a data reading packet;

re-transmitting means electrically connected to a telephone link connecting through a telephone company central office switch, and responsive to said control means for transmitting said data reading packet as an in-band electrical signal, said in-band electrical signal being transmitted over said telephone link; and communication means located at a remote location for receiving said in-band electrical signal over said telephone link.

21. An automated utility meter reading apparatus according to claim 20 further including a command means for providing a data request which is transmitted by said communication means over said telephone link connecting through a telephone company central office, wherein said control means initiates said transmission by said re-transmitting means responsive to said request.

22. An automated utility meter reading apparatus according to claim 21 wherein said control means selectively groups said selected meter readings from said scanning means as a data reading packet responsive to said request.

23. An automated utility meter reading apparatus according to claim 20 wherein said local distribution point is a telephone company interface box.

24. An automated utility meter reading apparatus according to claim 19 wherein said frequency of said out-of-band electrical signal is between about 20 kHz and about 100 kHz.

25. An automated utility meter reading apparatus according to claim 19 wherein each of said customers' telephone lines includes a tip and ring line over which said out-of-band electrical signal is transmitted.

26. An apparatus for automated acquisition of one or more of a customer's utility meter readings using the customer's telephone line, comprising:

acquisition means electrically connected to the customer's telephone line for converting said utility meter readings to an out-of-band electrical signal having a frequency and for transmitting said out-of-band electrical signal over the customer's telephone line, wherein the frequency of said out-of-band electrical signal is sufficiently offset from customer voice communication frequencies to substantially reduce interference during concurrent transmission of both said out-of-band electrical signal and customer voice communications over said customer's telephone lines; and signal shifting means located at a local distribution point for converting said out-of-band electrical signal from said customer's telephone line to an in-band electrical signal having a frequency within the range of customer voice communications, said in-band electrical signal being configured to be transmitted over a telephone link connecting through a telephone company central office switch to a remote location to thereby provide said customer's utility meter readings to said remote location automatically.

27. A method for customer information communication between a customer and a requesting location over existing communication lines, comprising:

(a) transmitting a request for customer information from a requesting location by telephone through a telephone company switch to a local distribution point;

(b) receiving the request for customer information at the local distribution point;

(c) transmitting the request for customer information from the local distribution point to the customer over existing communication lines modulated at a first out-of-band frequency range as an out-of-band frequency request;

(d) receiving the out-of-band frequency request from the local distribution point to provide an information request to the customer;

(e) electrically encoding customer information responsive to the information request to the customer;

(f) transmitting the electrically encoded customer information over the existing communications lines modulated at a second out-of-band frequency range as an out-of-band frequency information reading;

(g) receiving the out-of-band frequency information reading at the local distribution point; and, (h) re-transmitting the out-of-band frequency information reading from the local distribution point at in-band-frequencies through a telephone company switch to the requesting location.

28. A method according to claim 27 wherein the existing communication line is a customer telephone line.

29. A method according to claim 27 wherein the existing communication line is a customer cable line.

30. A method according to claim 27 wherein the customer information is a utility meter reading.

31. A method according to claim 27 wherein the customer information is a reading from a demand recorder.

32. A method according to claim 27 wherein the customer information is an alarm reading.

33. A method according to claim 27 wherein the customer information is voltage data.

34. A method for customer control communication between a customer and a requesting location over existing communication lines, comprising:

(a) transmitting a customer control request from a requesting location by telephone through a telephone company switch to a local distribution point;

(b) receiving the customer control request at the local distribution point;

(c) transmitting the customer control request from the local distribution point to the customer over existing communication lines modulated at a first out-of-band frequency range as an out-of-band frequency request; and, (d) receiving the out-of-band frequency request from the local distribution point to provide a control signal to the customer.

35. A method according to claim 33 wherein said customer control request comprises a command to control electrical service connection to the customer.

36. A method according to claim 33 wherein said customer control request comprises a command to control telephone service connection to the customer.

* * * * *